United States Patent [19]
Hilliard

[11] Patent Number: 5,272,474
[45] Date of Patent: Dec. 21, 1993

[54] METHOD AND APPARATUS FOR MONITORING THE STATUS OF TABLES

[75] Inventor: Jeffrey L. Hilliard, Granite Bay

[73] Assignee: Intelli-Host Corp., Granite Bay, Calif.

[21] Appl. No.: 701,535

[22] Filed: May 16, 1991

Related U.S. Application Data

[63] Continuation-in-part of Ser. No. 523,961, May 16, 1990, abandoned.

[51] Int. Cl.$^5$ .............................................. H04Q 1/00
[52] U.S. Cl. ........................... 340/825.08; 340/286.09
[58] Field of Search ................... 340/825.08, 825.06, 340/825.07, 825.17, 825.28, 825.29, 825.35, 825.36, 825.49, 286.01, 286.02, 286.06, 286.09, 311.1, 762, 782, 815.03, 815.1; 364/401, 406, 407

[56] References Cited

U.S. PATENT DOCUMENTS

| | | | |
|---|---|---|---|
| 1,796,668 | 3/1931 | Srafaty | 340/286.09 |
| 3,304,416 | 5/1958 | Wolf | 340/286.09 |
| 3,310,797 | 3/1967 | Auger | 340/286.09 |
| 3,585,595 | 6/1971 | Slavin | 340/825.06 |
| 3,631,448 | 12/1971 | Leslie | 340/286.01 |
| 3,686,653 | 8/1972 | Salenbien | 340/286.01 |
| 3,750,103 | 7/1973 | Angus et al. | 340/825.28 |
| 3,821,707 | 6/1974 | Peters | 340/286.09 |
| 3,962,698 | 6/1976 | Hunt et al. | 340/286.09 |
| 4,222,111 | 9/1980 | Sloan et al. | 340/286.09 |
| 4,530,067 | 7/1985 | Dorr | 364/401 |
| 4,701,849 | 10/1987 | Elden | 364/406 |
| 4,777,488 | 10/1988 | Carman, Jr. et al. | 340/825.08 |
| 4,887,074 | 12/1989 | Simon et al. | 340/782 |
| 4,924,217 | 5/1990 | Uwai | 340/782 |

OTHER PUBLICATIONS

"Computers Oversee All Activities of Tower Restaurant" Computer Design, vol. 16, No. 5, May 1977, pp. 50–54.

Primary Examiner—Donald J. Yusko
Assistant Examiner—Edwin C. Holloway, III
Attorney, Agent, or Firm—Townsend and Townsend Khourie and Crew

[57] ABSTRACT

A first table status control unit, which may be a master or maitre d' table status control unit, includes a first plurality of visual indicators, each visual indicator corresponding to an associated table for visually indicating the status of that table. A second table status control unit, which may be a waiter or busboy table status control unit, includes a second plurality of visual indicators, each visual indicator corresponding to an associated table in the first group of tables. A status entry device is provided for the first and second table status control units for entering status information for the tables. The possible table status include reserved, occupied, vacant, or closed (unavailable) and the keypad may be used to enter a time at which the table is to have a reserved status. Any number of reservation times may be entered for each table. If desired, an average seating time may be entered through the keypad or calculated by the processor so that, if the maitre d' wishes to seat a party at a table that is reserved at a later time, then seating will be allowed if the average seating time is less than the time remaining until the reservation time, or prohibited if the average seating time is greater than the time remaining until the reservation time. When a party is seated at a table that is reserved for a future time, then the system alerts the maitre d' if the reservation time is approaching and the table is still occupied. The average seating time also may be used to alert the maitre d' if a table has been occupied longer than the average seating time.

30 Claims, 5 Drawing Sheets

METHOD AND APPARATUS FOR MONITORING THE STATUS OF TABLES

This application is a continuation-in-part of application Ser. No. 07/523,961 filed on May 16, 1990, now abandoned.

BACKGROUND OF THE INVENTION

This invention relates to a method and apparatus for monitoring the status of tables and, more particularly, to an apparatus for monitoring the occupancy status of tables and for implementing a number of seating plans in a restaurant.

Many modern restaurants are divided into a number of different dining areas. Each dining area typically has its own decor and is somewhat isolated from the other dining areas thereby providing great enjoyment for the customers. Such restaurants often have an entrance area which is quite remote from one or more of the various separate dining areas, and, in many instances, some of the dining areas are completely hidden from the view of the entrance area.

In relatively large scale restaurant operations, a relatively high rate of turnover for the customers is required so that the business remains profitable. It therefore becomes essential to direct the customers as quickly as possible to the tables as they become available. Since the maitre d' is not in a position to observe the various tables in the many rooms from his or her position in the entrance area, and since it is impractical for the maitre d' to travel continuously from room to room to check the status or condition of the various tables, it is desirable to provide some means for indicating the status of the tables throughout the restaurant to the maitre d' so that he or she does not have to leave the entrance area. It is also desirable to allow the maitre d' to allocate table reservations and indicate the change of status of a table without having to rely upon busy waiters and busboys.

One known system for monitoring the status of restaurant tables includes a processor unit coupled by means of serial data buses to a host unit and to a plurality of service units. The host unit includes separate push buttons which correspond to tables within a particular service area of the restaurant. Table status (e.g., occupied, being bused, or vacant) is set by depressing the appropriate table button. The status information for each table is then transmitted to the appropriate service unit and to the host unit to illuminate or flash the appropriate table buttons for indicating the table status to restaurant personnel. The push buttons are oriented on the display in the same configuration as the tables in the restaurant, so a separate unit must be fabricated for each restaurant and whenever different table layouts are desired. Furthermore, the larger the restaurant, the larger the unit. Consequently, such units are impractical for very large and multi-floored restaurants. Finally, the units do not have the capability of implementing seating schemes.

SUMMARY OF THE INVENTION

The present invention is directed to an apparatus for monitoring the status of a plurality of tables and for implementing a number of seating schemes in a restaurant or elsewhere. A device according to the present invention may be used in restaurants of almost any size and with any modifiable configuration. In one embodiment of the present invention, a first table status control unit, which may be a master or maitre d' table status control unit, includes a first plurality of visual indicators (e.g., BILED's), each visual indicator corresponding to an associated table for visually indicating the status of that table. A first keypad having a plurality of closely spaced entry keys is provided for entering status and function information corresponding to a first group of tables. One or more second or slave table status control units, which may be waiter or busboy table status control units, includes a second plurality of visual indicators, each visual indicator corresponding to an associated table in the first group of tables. A status entry device is also provided for the second table status control unit for entering status and function information corresponding to the first group of tables. A processor receives the status and function information from the first table status control unit and the status and function information from the second table status control unit. The data is used to activate the first and second pluralities of visual indicators for indicating the status of each table in the first group and for implementing a number of desired seating schemes.

The possible table status include reservation pending, occupied, available, closed (unavailable), table seated longer than the average seating time, or occupied table with reservation collision possible. The keypad may be used to enter a requested table number, smoking preference, table priority, reservation time, table class, top size, area/waiter assignments, and table status changes. If desired, an average seating time may be entered through the keypad or calculated by the processor so that, if the maitre d' wishes to seat a party at a table that is reserved at a later time, then seating will be allowed if the average seating time is less than the time remaining until the reservation time, or prohibited if the average seating time is greater than the time remaining until the reservation time. The average seating time also may be used to alert the maitre d' if a table has been occupied longer than the average seating time. When a party is seated at a table that is reserved for a future time, then the system alerts the maitre d' if the reservation time is approaching and the table is still occupied.

Seating schemes implemented by the device according to the present invention include seating by party size, seating by table number, seating by smoking preference, seating by table priority or class, seating by area or waiter (including area or waiter rotation), table balancing and people balancing in multiple ares, graduated seating in newly opened areas, opening/closing areas, moving a party from one table to another, and reservation allocation.

Finally, the device according to the present invention incorporates a novel communication method for the master and slave table status control units wherein communication is effected over a single cable current loop, and a novel method for driving the visual indicators wherein serial/parallel converters are used for selectively illuminating the visual indicators.

BRIEF-DESCRIPTION OF THE DRAWINGS

DETAILED DESCRIPTION OF THE PREFERRED EMBODIMENTS

Figure 1:
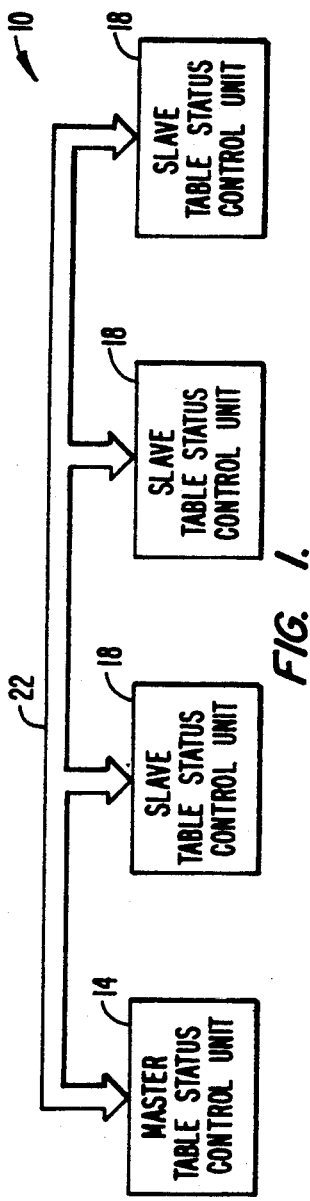
FIG. 1 is a block diagram of a particular embodiment of an apparatus according to the present invention for monitoring the status of tables.

FIG. 1 is a block diagram of a particular embodiment of an apparatus 10 according to the present invention for monitoring the status of tables in a restaurant or other establishment. Apparatus 10 includes a master table status control unit 14 and a plurality of slave table status control units 18. Master table status control unit 14 and slave table status control units 18 communicate with each other over a bus 22. Master table status control unit 14 may be located at the entrance area or maitre d' station of a restaurant, whereas the slave table status control units 18 may be located in the separate dining areas, rooms or floors of the restaurant.

Figure 2:
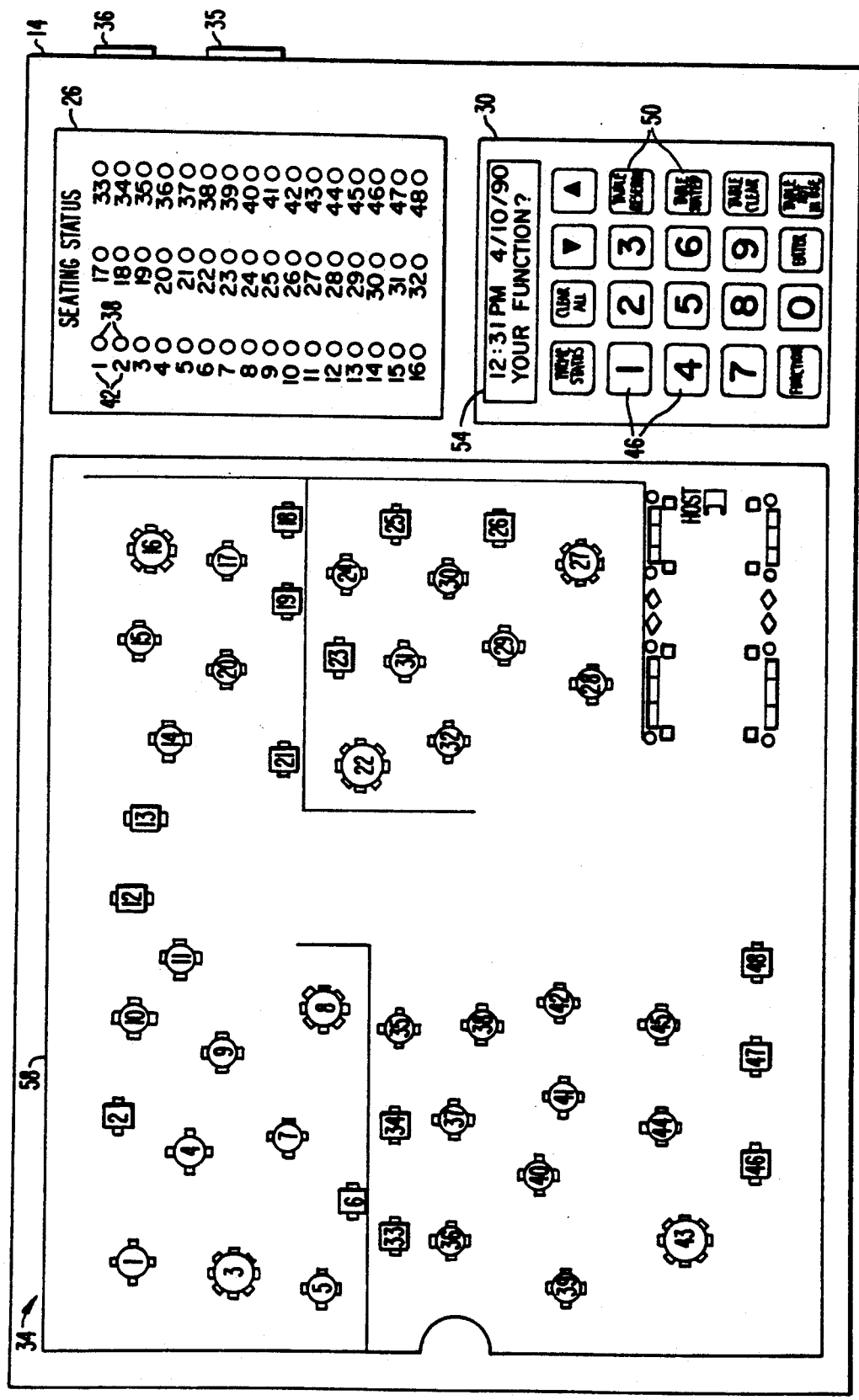
FIG. 2 is top plan view of a particular embodiment of a table status control unit according to the present invention.

FIG. 2 is a top plan view of a particular embodiment of a table status control unit, e.g., master table status control unit 14. Master table status control unit 14 includes a status display 26, a keypad 30, an overlay area 34, a printer port 35, and a display expansion port 36. Status display 26 includes a plurality of BI-LED's 38 for indicating the status of each table in the restaurant. Preferably, each table is assigned a code 42 which is printed next to or otherwise associated with a corresponding LED 38. In this embodiment, the states which are annunciated on each LED 38 are as follows:

| | |
|---|---|
| Flashing Red | Reservation pending |
| Flashing Green | Table has been seated longer than the average seating time |
| Solid Red | Occupied table |
| Solid Green | Table is available |
| Flash RED/GRN | Table is occupied and a reservation collision is possible, (e.g., triggered 10 min. before the reservation time to warn of a possible conflict) |
| LED Off | Closed Area |

Other combinations of solid or flashing colors may be employed for any desired table status.

Keypad 30 includes a plurality of numerical keys 46, a plurality of function keys 50, and a keypad display 54. Unlike known systems, keypad 30 is located separately from the status indicators and may be used in a generic manner to implement a number of functions. For example, the table number may be entered using the numerical keys 46, and the status of that table may be entered using the function keys 50. Other uses of keypad 30 will be discussed in more detail below. Keypad display 54 interactively prompts the operator when information is being entered. Keypad display 54 may also display the current time.

Overlay area 34 includes a removable overlay 58. Overlay 58 may comprises a map of the restaurant showing the location of each table along with cross reference information (e.g., table number) to associate each table to a particular LED in status display 26. Thus, the restaurant personnel may instantly determine the status of a particular table by referring to the LED associated with that table. The map also shows the grouping of tables in areas by physical location and/or waiter assignment. By constructing table status control units in this way, the restaurant's seating arrangement may be changed with minimum effort. All that is required is to program the new table/LED cross references and/or print a new overlay. Furthermore, since a keypad is used instead of dedicated switches for each table, a very large number of tables may be monitored without significantly affecting the size of the unit.

Printer port 35 is used to communicate status and any other information stored or calculated to a printer (not shown) so that management reports may be created. Display expansion port 36 is used to add LED's to status display 26.

The slave table status control units 18 are constructed in the same general way as master table status control unit 14 except, if desired, only the tables in the separate dining area monitored by that table status control unit are illustrated in overlay area 34, and the number of LED's in status display 26 may be increased or decreased as desired.

Figure 3:
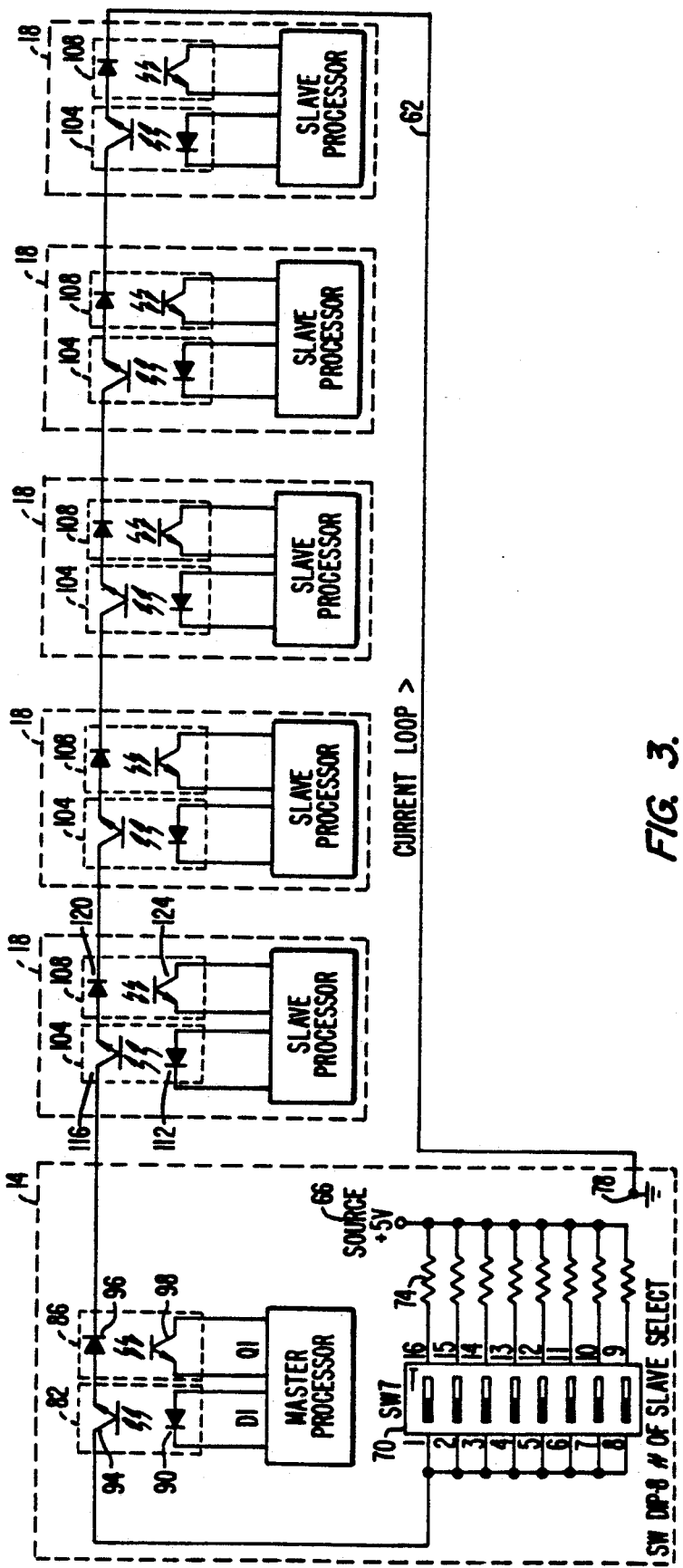
FIG. 3 is a partial schematic diagram showing a particular embodiment of a communication loop for a plurality of table status control units according to the present invention.

FIG. 3 is a partial schematic diagram showing how master table status control unit 14 communicates with the plurality of slave table status control units 18. Master table status control unit 14 and slave table status control units 18 are coupled together through a current loop 62 which originates and terminates in master table status control unit 14. Master table status control unit 14 includes a voltage or current source 66 which is coupled to current loop 62 through a dip switch 70 and a plurality of resistors 74. The amount of current flowing through current loop 62 is determined by the number of closed switches in dip switch 70. Current loop 62 terminates in master table status unit 14 at a ground 78.

Master table status control unit 14 further includes a transmitter optoisolator 82 and a receiver optoisolator 86. Transmitter optoisolator 82 comprises a photodiode 90 and a phototransistor 94. Phototransistor 94 is coupled to current loop 62 so that current flows along current loop 62 in response to signals from photodiode 90. Receiver optoisolator 86 comprises a photodiode 96 and a phototransistor 98. Photodiode 96 is coupled to current loop 62 so that it emits optical signals in response to current flowing through current loop 62. The optical signals, in turn, cause current to flow through phototransistor 98.

Each slave table status control unit 18 is constructed in a similar manner. That is, each slave table status control unit 18 includes a transmitter optoisolator 104 and a receiver optoisolator 108. Each transmitter optoisolator 104 comprises a photodiode 112 and a phototransistor 116 wherein phototransistor 116 is coupled to current loop 62. Each receiver optoisolator 108 comprises a photodiode 120 and a phototransistor 124 wherein photodiode 120 is coupled to current loop 62. In this embodiment, slave table status control units 18 do not include their own current sources and therefore cannot directly flow current into current loop 62.

In operation, each phototransistor 116 in slave table status control units 18 is closed for allowing current to flow freely through current loop 62. Master table status control unit 14 communicates with all slave table status control units 18 simultaneously by pulsing photodiode 90 which, in turn, causes phototransistor 94 to generate current pulses on current loop 62. The pulsing current then will cause photodiode 120 in each slave table status control unit 18 to generate optical pulses to its corresponding phototransistor 124, thereby capturing the message sent by master table status control unit 14.

In this embodiment, slave table status control units 18 do not transmit information to master table status control unit 14 unless specifically requested (polled) by master table status control unit 14. Each slave table status control unit 18 preferably has its own address code so that it may be addressed and communicated with individually. When data is to be transferred from a slave table status control unit 18 to master table status control unit 14, then master table status control unit 14 addresses an information request message to one of slave table status control units 18. The non-addressed slave table status control units take no action, and their phototransistors 104 remain closed. When master table status control unit 14 is ready to receive data from the addressed slave table status control unit 18, then phototransistor 94 in master table status control unit 14 is closed for supplying continuous current to current loop 62. Thereafter, the addressed slave table status control unit 18 pulses its photodiode 112 which, in turn, causes its associated phototransistor 116 to generate current pulses along current loop 62. The current pulses cause photodiode 96 in master table status control unit 14 to generate optical pulses. The optical pulses cause current to flow though phototransistor 98, thereby capturing the message sent by the addressed slave table status control unit.

Figure 4:
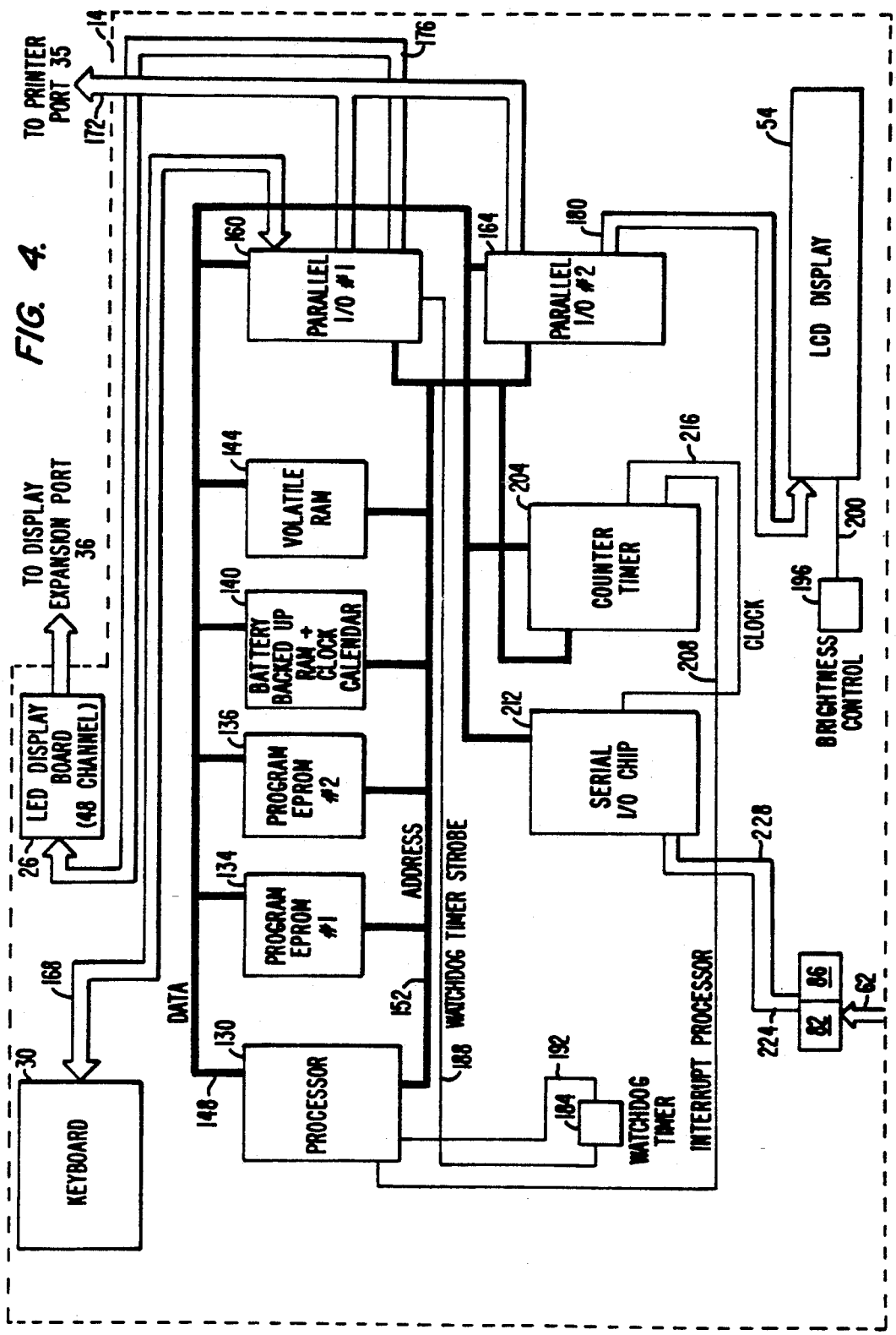
FIG. 4 is a block diagram of a particular embodiment of the table status control unit shown in FIG. 1.

After all slaves respond, the master is fully updated, and all current information from the system is stored in a battery backed up RAM 140 (FIG. 4). In case of a power failure, the master simply broadcasts updated information to all slave units to restore their previous states.

FIG. 4 is a block diagram of master table status control unit 14. Master table status control unit 14 includes a processor 130, program EPROMS 134 and 136 for storing the programs used by processor 130, a battery backed-up RAM 140 for storing table status and other information in case of system or power failures, and a volatile RAM 144 which is used as working storage for programs executed by processor 130. Processor 130, EPROMS 134 and 136 and RAMs 140 and 144 are coupled to a bidirectional data bus 148 and to a bidirectional address bus 152.

Master table status control unit 14 also includes parallel I/O interfaces 160 and 164. I/O interfaces 160 and 164 are both coupled to data bus 148 and address bus 152. I/O interface 160 is further coupled to keypad 30 through a keypad bus 168, to printer port 35 through a printer port bus 172, and to status display 26 through a status display bus 176. I/O interface 164 is further coupled to printer port 35 through printer port bus 172 and to LCD display 54 through a display bus 180.

A watchdog timer 184 is coupled to I/O interface 160 through a watchdog line 188. I/O interface 160 is strobed and monitored to determine if there has been a processor failure. If an excessive amount of time has elapsed between monitored events, then a reset signal is supplied to processor 130 over a reset line 192. The current system state is restored using the information stored in RAM 140.

A manually operated brightness control unit 196 is coupled to display 54 through a brightness control line 200 to control the backlighting of display 54.

A counter/timer 204 is coupled to data bus 148 and to address bus 152 for timing events for master table status control unit 14. For example, counter/timer 204 functions as an interrupt timer, and it provides periodic interrupt signals to processor 130 over an interrupt line 208 at a frequency determined by the programmer. These signals are used in part to initiate the communication routines used to update RAM 140. Counter/timer 204 also supplies clock signals to a serial I/O chip 212 over a clock line 216. Serial I/O chip 212 is coupled to data bus 148 and formats the data for transmission over current loop 62. Serial I/O chip 212 is coupled to transmitter optocoupler 82 and receiver optocoupler 86 through a transmitter line 224 and a receiver line 228, respectively.

The slave table status control units are constructed the same way, except there is no need for periodic interrupt signals to initiate communications in this embodiment since the slave units only send information when requested by the master. The interrupt signals are still used for keyboard entry and other software functions, however.

Figure 5:
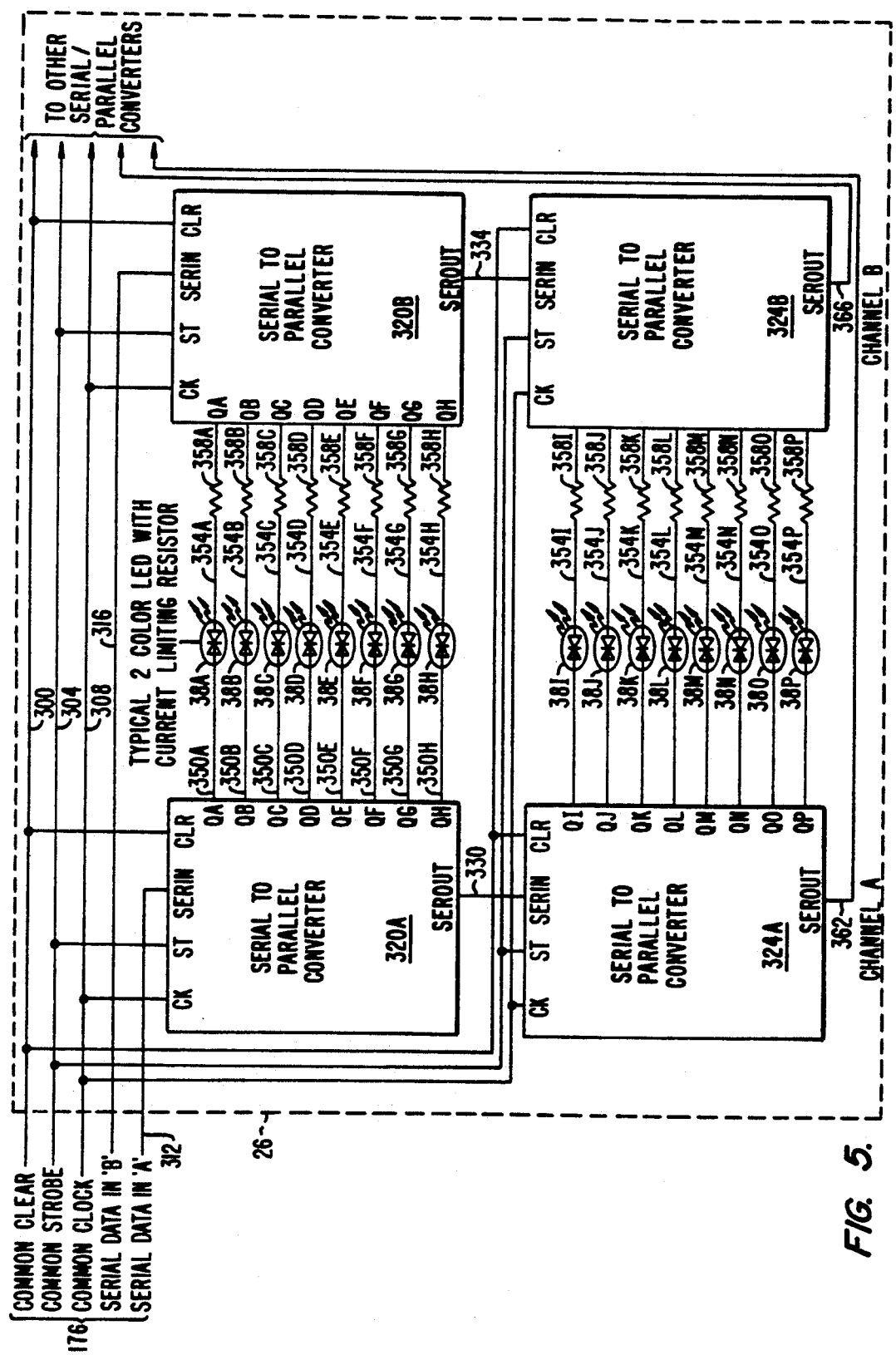
FIG. 5 is a schematic diagram of a portion of the LED display board shown in FIG. 4.

FIG. 5 is a schematic diagram showing how LED display board 26 is driven. Sixteen BILED's 38, designated 38A-P, are shown for purposes of example, and the circuitry is duplicated for the remaining BILED's. In general, status display bus 176 comprises a common clear line 300, a common strobe line 304, a common clock line 308, a serial data in A line 312, and serial data in B line 316. Common clear line 300, common strobe line 304 and common clock line 308 are each coupled to the CLR, ST and CK terminals of serial-to-parallel converters 320A, 320B, 324A, and 324B. Serial data in A line 312 is coupled to the SERIN terminal of serial-to-parallel converter 320A, and serial data in B line 316 is coupled to the SERIN terminal of serial-to-parallel converter 320B. The SEROUT terminal of serial-to-parallel converter 320A is coupled to the SERIN terminal of serial-to-parallel converter 324A through a line 330, and the SEROUT terminal of serial-to-parallel converter 320B is coupled to the SERIN terminal of serial-to-parallel converter 324B through a line 334. Terminals 350A-H of BILED's 38A-H are coupled to respective parallel output terminals QA-QH of serial-to-parallel converter 320, and terminals 354A-H are coupled to respective parallel output terminals QA-QH of serial-to-parallel converter 320B through current limiting resistors 358A-H. Similarly, terminals 350I-P of BILED's 38I-P are coupled to respective parallel output terminals QI-QP of serial-to-parallel converter 324A, and terminals 354I-P are coupled to respective parallel output terminals QI-QP of serial-to-parallel converter 324B through current limiting resistors.

Serial-to-parallel converters 320A and 324A may be considered to be a first driving channel (channel A) for BILED's 38A-38P, and serial-to-parallel converters 320B and 324B may be considered to be a second driving channel (channel B) for BILED's 38A-38P. The SEROUT terminal of serial-to-parallel converter 324A is coupled to a line 362 for providing the serial data to other serial-to-parallel converters in channel A for the remaining BILED's, and the SEROUT terminal of serial-to-parallel converter 324B is coupled to a line 366 for providing the serial data to other serial-to-parallel converters in channel B for the remaining BILED's.

In operation, a series of bits are serially shifted into the serial-to-parallel converters in channels A and B, and the state of the parallel outputs determine the state of the associated BILED's. For example, if the QA output terminal of serial-to-parallel converter 320A is a "1" and the QA output terminal of serial-to-parallel converter 320B is a "0," then BILED 38A is illuminated red, whereas if the QA output terminal of serial-to-parallel converter 320A is a "0" and the QA output terminal of serial-to-parallel converter 320B is a "1," then BILED 38A is illuminated green. Common states of 0-0 or 1-1 for the respective output terminals shut off BILED 38A. Flashing states of BILED 38A may be effected by alternating the states of the output terminals.

OPERATION

GENERAL DEFINITIONS

The following definitions should be referred to in the discussion which follows.

Automatic People Balancing—The automatic balancing of people to each server. When a new party is seated, the computer will calculate which server has the least number of people to serve and if possible, will seat the party in that area. If this seating is not possible, the computer will select the next best area to seat people in order to keep the number of people per server balanced.

Automatic Table Balancing—The automatic balancing of tables to each server. When a new party is seated, the computer will calculate which server has the least number of tables to serve, and if possible, will seat the next available party. If this is not possible, the computer will decide the next best area to keep the number of tables balanced.

Automatic Table Rotation—The automatic allocation of tables to servers to ensure that each server serves approximately the same number of tables during a shift and that a particular server does not have to serve a number of new parties all at once. That is, after a server is selected to serve a party, that server will not be required to serve a new party until the other servers have been assigned to subsequently arriving parties. If desired, the server will be assigned to another party ahead of the other servers only if no other tables are available.

Average Table Turn Time (ATTT)—The manually entered table turn time used by the computer. This is the ideal average table turn time entered by management and used as a target for the most efficient time to turn tables. 2 top, 4 top, 6 top, 8 top, and 10 top tables all can have different ATTT times. Table Turns—The number of times a table has been seated and cleared within a specific period of time.

Calculated Average Table Turn Time (CATTT)—The average time it takes a party to be seated, eat their meal, and have the table cleared and ready for the next seating. This is the time calculated by the computer based on the actual seating time and the clearing time for each table individually. In the preferred embodiment, 2 top, 4 top, 6 top, 8 top, and 10 top tables all have a different CATTT.

Clear Bookkeeping—A function used to reset all statistics including table turn times and table turns.

Closed Area—A table or group of tables which has been closed by the staff. This area will be ignored by the computer until it is opened at a later time.

Estimated Time Available (ETA)—The time estimated by the computer until the table in question is due to change to available status. When a table is requested but not available, the computer will calculate when the table will be free based on average table turn time, seating time, etc.

Host Recall Time—A function in the computer that determines how many minutes will elapse before a host-/hostess is recalled for an available table when Pass has been pushed.

Maximum Overseat Limit (MOL)—When a table is unavailable with the number of tops required for the party, the system will attempt to seat the party at a larger table. The Maximum Oversize Limited specifies how much larger the table can be than the party you are seating. This number is referred to in pairs so an MOL of 1 will allow the party to be seated at a table with 2 more seats than required. An MOL of 2 will allow the computer to seat a party at a table with 4 more tops than people etc.

Menu Time Out Time—This is the amount of time display 54 will continue to hold the last function without input from the keyboard. This is a programmable management function accessible only through password protection.

No Show Time—This is the time allowed after a reservation is due and the party hasn't arrived. If this time is exceeded, the reservation will be cancelled.

People Turns—The number of people that have been seated, have finished eating, and have departed over a specific period of time.

Priority Areas—Each table can be assigned to a PRIORITY AREA. Generally, PRIORITY 1 tables are the best tables or most requested tables in the restaurant. PRIORITY 4 tables are the least desirable tables available.

Reservation Collision Warning Time (RCWT)—This is a programmable time to warn the operator of a reservation collision (i.e., an occupied table with a reservation pending). When a table is occupied, and the parties have been seated longer than the average seating time, and a reservation is approaching, a possible collision may occur. The computer will warn the Host that this is about to occur at the reservation time—the RCWT. The Host must then move the seated party to another table or the bar, or move or extend the reservation pending.

Reservation No Show Time—This is the maximum amount of time after a reservation has come due before the reservation is automatically cancelled. If a reservation has been made for a specific time, and the no-show time has been set for 15 minutes, if the party does not show up for that reservation within 15 minutes of the reservation time the reservation will be automatically cancelled.

Set Beeper—This function is used to turn on or off the internal beeper or, selectively activate the sounding device only for specific functions.

Setups—There is a possibility of 14 preprogrammed "setups" using the present system. These setups dictate the number of servers currently on staff and working, and their table assignments. Setups can be changed by management at any time when an additional server has been added or removed. The setup information is referred to when the system calculates the number of table turns by server number, and the people balancing.

Start New Day—At the beginning of a new day, this function is used to clear all tables and reset all daily bookkeeping totals.

Table Top Size—On any given table the TABLE TOP SIZE is an indicator of the maximum number of people that can be seated.

Unclear Tables—If a table has been cleared accidentally, UNCLEARING the table will restore it to its previous start with all turn times remaining in tact.

KEYPAD DEFINITIONS

Soft Keys—The upper 4 keys on the keypad which are used in many ways. When these keys are used as soft keys, a legend is displayed in the LCD window directly above the keys. When in normal use, the keys have the function printed on the front of each individual key.

STATUS/SOFT KEY #1—Used to find the current or past status of any table, or any reservation. This key is also used to determine the number of top types that exist in the restaurant. The soft key function of the Table Status key changes the function of the key whenever the LCD display shows a different function directly above the key.

CLEAR/SOFT KEY #2—This key is used to clear information on the display when required. When used as a soft key, this button changes function as the display window on the LCD indicates.

DOWN ARROW/SOFT KEY #3—A scroll key used to move down through a menu. This Soft Key function of the Down Arrow key changes functions as the display window on the LCD indicates.

UP ARROW/SOFT KEY #4—A scroll key used to move up through a menu. The Soft Key function of the Up Arrow key charges functions as the display window on the LCD indicates.

RESERVE—Used to reserve a table. A table can be reserved by the party size or by a specific table number using this key.

SEAT—This key is pushed when a party is to be seated. The party will be seated based on the size of the party, based on a pending reservation, or based on a specific table.

CLEAR TABLE—This key is used by the bus staff to tell the computer about clear tables.

TABLE NOT IN USE—Used to close areas of the restaurant. If an area or specific tables are closed, the Intelli-Host TM will not seat people in that area. Manual seating can occur in closed areas or tables if needed.

ENTER—This key is normally pushed following any number entry.

0-9—Number keys used to enter numbers when requested.

FUNCTION—This key allows the management to enter the advanced function menu using a password. All major changes to the system are programmed from the function key menus.

OPERATION OVERVIEW

TABLE ARRANGEMENTS—The computer keeps track of table top types in a restaurant and uses the information for valuable printed reports at selected times during the day. When the computer is first installed, the table top and location information is put into the system by the manager for use during seating. When a table is to be seated, the computer uses this information to help determine the most appropriate location. Table sizes from 2 top, 4 top, 6 top through 20 tops can be used.

SMOKING AND NON-SMOKING AREAS—In addition to the table arrangements explained in the previous paragraph, SMOKING and NON-SMOKING areas are set up by the management during the initial installation. Each table in the restaurant is designated as a Smoking or Non-Smoking table. In a case where an entire restaurant is either smoking or non-smoking, this function can be turned off by the management by using the function menu with password protection.

TABLE PRIORITIES—During the initial setup of the system, all tables can be assigned under one of four table priorities. Tables assigned under Priority 1 are your best tables in the restaurant (i.e., window tables). Priority 2 tables could be tables that are your second most asked for etc. Finally, your least desirable tables are designated as Priority 4 tables. When a party arrives to be seated, the computer asks for the party size, the Smoking preference, and then the table priority is requested. If a Priority 1 table is requested, only a table meeting the Priority 1 designation would be chosen. If a Priority 2 table is requested, the computer will seat the group in either a Priority 1 or 2 area. In the same respect, a choice of Priority 4 would seat a party in any area of the restaurant. When a Priority one area is requested but not found, the computer will calculate the waiting time for a table to become available in that area, and if requested a reservation number will be issued.

TABLE CLASSES—As an alternative to table Priorities, Table Classes can be set up. Under the Table Class concept, each table is designated a Class (A-D). Table classes work totally independently meaning that if a Class A table is requested, only a Class A table will be chosen by the computer for automatic seating. Additionally, if a Class B table is chosen, only a Class B area will be selected by the computer. This function can be used to delineate between different table types. For example, a window table can be assigned Class A, and all booths in your restaurant can be assigned Class B. If a booth is requested, the computer will only search for a table in the Class B area, thus only a booth will be selected. All classifications from A-D can be used; however, as few as two classes or Priorities will also work well.

POP-TOP TABLES—In many restaurants, tables can be expanded to accommodate larger parties. During the installation of the computer all tables are assigned a TOP SIZE, so the computer can make intelligent decisions about where to seat a party. If a specific table is requested where the party size exceeds the number of seats at the table, the computer will confirm that the group is larger than the table and ask for a confirmation from the Host/Hostess. After this confirmation, the party will be seated. Upon clearing of this table, the average seating time will be calculated by the number of people seated at the table and not by the top size.

WHEN A PARTY IS TO BE SEATED—When a party arrives to be seated, 3 questions need to be answered so the computer can make a reasonable decision as to the seating location. First, the size of the party. Secondly, if Smoking and Non-Smoking areas are used in the restaurant, does the group want a Smoking or Non-Smoking table or No Preference. Finally, if tables have been assigned a priority, which priority type does the party prefer? When these questions have been answered, the computer scans all tables in the restaurant, and either immediately locates a table or will respond with a calculated waiting time in minutes. If a table is not available, the computer will assign a reservation number to that party, and they are then put into a waiting line within the computer. As tables are cleared, the computer scans the reservations and locates the next party fitting the description of people who can be accommodated by that location. In general, the computer is attempting to fill all tables as fast as possible, with a minimum amount of waiting by any party.

HOW TABLE AND PEOPLE BALANCING WORKS—Table Balancing refers to making sure that all servers have approximately the same number of tables to serve. If the restaurant is not particularly busy, and the computer has a choice of a few different tables in different areas to seat a party, it will choose the server with the least number of occupied tables, and makes every attempt to "Balance Tables". People Balancing works in a similar fashion except that it balances people in an area instead of balancing tables. This assures that all servers serve approximately the same number of people at any given time. If required, People Balancing and Table Balancing can be ignored and tables can be manually seated if needed.

TABLE ROTATION—Table rotation ensures that work is fairly allocated to all servers. Once a party has been assigned to a server, that server will not be called upon to serve another party until the other servers have been assigned the parties arriving thereafter. For example, if there are three servers available, and if a party is seated in server two's area, then the next party to arrive must be assigned to servers one or three. If server one is assigned the next party, then server three must be assigned the party which arrives thereafter.

GRADUATED SEATING IN NEWLY OPENED AREAS—In a particular setup, it is sometimes necessary to close a number of areas at the beginning of a seating period until enough customers arrive to increase the serving staff. The areas that remain open will balance automatically as seatings occur. When a new area is opened, if true Table Balancing is followed, the new server would receive all of the newly seated parties until all areas are balanced. To prevent this occurrence, the Graduation can be changed so that newly opened areas will receive table seatings on a gradual basis instead of all at once. This graduation rate can be changed by the management using the function menus provided.

OPENING/CLOSING AREAS IN A SETUP—Since the wait areas are programmed into the computer by the management, it is easy to Open or Close wait areas. Using the appropriate function keys, a single wait area in a setup can be opened or closed at any time. If an area is closed where patrons are still seated, its tables will automatically be closed out when the tables have been bused.

SETUPS AND HOW THEY WORK—Each waiter or waitress in a restaurant has an individual area they serve. Each area includes a group of tables, each referred to by table numbers. A Setup is a division of the restaurant into serving areas. The areas depend on the number of tables and the number of servers to be assigned. In the following examples, there are 13 tables and 3 servers. The division of tables among the areas and the people assigned constitute a Setup for the restaurant.

| Waitress | Area # | Serving Tables |
|---|---|---|
| Joan | 1 | 2, 4, 7, & 9 |
| Sandy | 2 | 1, 6, 10, & 13 |

-continued

| Waitress | Area # | Serving Tables |
|---|---|---|
| Ralph | 3 | 3, 5, 8, 11 & 12 |

If the manager opens more tables and adds servers, the new division of serving areas can be programmed into the computer and labeled setup #2. For example:

| Waitress | Area # | Serving Tables |
|---|---|---|
| Joan | 1 | 2, 4, 7, & 8 |
| Sandy | 2 | 1, 9, 13, 14, & 15 |
| Ralph | 3 | 3, 5, 10, & 16 |
| Steve | 4 | 6, 11, 12 & 17 |

Notice that a fourth wait area has been added, and all of the tables numbers have been shifted around to accommodate another server and more tables. The system can accommodate up to 14 setups, all being completely different in their composition. During a business day, it may be necessary to change the setup many times as more people and areas are added and/or removed. A setup with 3 areas and of course 3 servers would normally be referred to as Setup #3.

DETAILED OPERATION

SEATING A PARTY BY THE SIZE OF THE GROUP IN A SMOKING AREA—The system keeps track of people and tables in a restaurant. When a party arrives and requests a table, simply press the SEATED key. The computer then presents the operator with a few choices. Reading the LCD display, you can seat a party by the SIZE of the group, by the TABLE number, or by a RESerVation. The keys directly below the words SIZE TABL RESV & EDIT (soft keys) are used to select the way you wish to select a table. Using the soft keys, select SIZE, meaning you wish to have the computer select a table for your group based on the SIZE of the party. The LCD will read "ENTER PARTY SIZE". Using the keypad enter the number of people in the party, then press ENTER. The computer will then display the Preference Screen (IF USED) and request SMOKing, NoSMoKing, and NO PReference. You then select the SMOKing option using the leftmost soft key. The computer will then search the restaurant for an available table capable of seating a party of that size, and fitting the Smoking parameter. Immediately, the LED TABLE STATUS DISPLAY will light up tables in the restaurant fitting the description of your request. One of the lights will be flashing, indicating that to keep Table Balancing, People Balancing or Table Rotation in effect, this is where you should seat the party. If you agree with the computer's table choice, simply push the ENTER key. The associated light will turn RED indicating that the table is now occupied. If you don't agree with the table selection made, you can simply enter the number of any other lighted table followed by the ENTER key. The party can then be seated and the associated indicator light will turn RED. In either case, the LCD information display will show "SEATING AT TABLE_". To complete this process, push the ENTER key, and seat the party.

IF A TABLE CAN NOT BE LOCATED—If a table could not be located, the computer will attempt to seat the party at a larger table. The maximum size of a table with an undersized party is preset by the management. If a larger table is not available, the system will calculate the approximate seating time (using averages)

and display the current calculated waiting time on the LCD display. Each time you push the SMOKing or Non-SMOKing soft keys, the computer will calculate the current estimated waiting time. If you have pushed the key marked SMOK representing a SMOKING AREA and if the calculated waiting time is acceptable, you then push the WAIT key and a reservation number will be issued. The computer will then assign the party a reservation, based on the average seating time for a table of that size, and keeping in mind the length of time that the tables of that size have been occupied. When a reservation is issued a corresponding reservation number is displayed. Using reservation pads, you record the name of the party next to their reservation number on the pad. When a table becomes available fitting the complete description requested, the computer will beep 3 times and notify the Host/Hostess.

SEATING A PARTY BY TABLE NUMBER—In some cases, it may be necessary to seat a party that wants a specific table. If the table is in-fact an available table, this request is easy to satisfy with the apparatus according to the present invention. Start by pushing the key market "SEAT". The LCD display will then request Seat by SIZE, TABLe, RESerVation or EDIT. You simply push the soft key under the word TABL on the display. You will then be prompted to enter the TABLE NUMBER. Enter the table number and press the "ENTER" key. Finally, you will be asked SIZE OF PARTY? Enter the appropriate party size followed by the ENTER key. If the table is a seatable table, the display corresponding to that table number will turn SOLID RED indicating the table has been seated. If the table is occupied, reserved or for some other reason can not be seated, the display will briefly explain the problem and return to the main menu screen.

MOVING A PARTY FROM ONE TABLE TO ANOTHER—Occasionally a group will be seated and decide to move to another table. If this occurs, push the SEAT key indicating you wish to SEAT a table. The next screens asks if you wish to seat by SIZE, TABLe, RESerVation, or EDIT. Press the far right soft key under the word EDIT in the LCD display. Next the computer will display EDIT TABLE#:___. You then use the keypad to enter the table number followed by the ENTER key. Finally the LCD displays SIZE, TBL. The computer is requesting if you wish to edit the SIZE of the party or the TABLE. If you select SiZE, you will then be asked for the new SIZE of the party. If you select TBL, the computer is assuming you wish to move the party to another table. After TBL is selected, the LED display will show which tables are available to accept your party. Simply enter the table number and press enter. All statistics from the first table will be transferred to the second location and the first table will remain available. If the destination table is not seatable by a party of that size, you will be notified of an undersized table and asked to accept or reject the move.

CLEARING A TABLE OR GROUP OF TABLES—When a table has been bused, it is important that the busing crew informs the computer. This can be done at any slave station or from the master console. To clear a table, simply push the CLEAR TABLE key. The computer will request "Table Number."? You can enter a table number and then press the ENTER key. If more than one table was cleared, multiple table numbers can be input by entering a number, press ENTER, enter a second number and press ENTER, and continue on until all table numbers have been entered. When this process is completed, all units in the system are updated immediately. If the clear tables start with a table number and end with another in order, you can enter the first number, press the up or down arrows to insert a dash (-) and then enter the last table number. The computer will then clear the starting table, the ending table, and all tables in between. This group clearing function can not be used if there is a table in the middle of the group which was not seated in the first place.

REMOVING A TABLE OR GROUP OF TABLES FROM SERVICE—It sometimes becomes necessary to remove a table or a group of tables from service. This is referred to as a CLOSED AREA. To remove a table from service, press the TABLE NOT IN USE key. The computer will request "ENTER TABLE NUMBER". Using the digital keypad, simply enter the table number of the closed table and push the ENTER key. If multiple tables need to be closed, enter the table number of the first table, press ENTER and then ENTER key. If multiple tables need to be closed, enter the table number of the first table, press ENTER and then enter the second number and follow it with the ENTER key and continue on until finished. If the closed area tables start with a table number and end with another in order, you can enter the first number, then press the up or down arrows to insert a dash (-) and then enter the last table number. The computer will then close the starting table, the ending table, and all tables in between. This group closing function can not be used if there is a table in the middle of the group which was seated or reserved prior to the closings.

ENTER RESERVATIONS BY TABLE NUMBER—To take a table reservation, push the RESERVE key. The display will respond with "RESERVE BY SIZE, TABLe or DELete a reservation.". If you wish to reserve a table by a specific TABLE number press the soft key under the LCD marked TABL. Next you will be asked for a reservation time. Using the numeric keypad enter the time starting with the hours and then minutes. The computer will assume an AM or PM seating time based on the current time; however, if you need to change the time from AM to PM use the UP or DOWN arrow keys. When you have successfully entered the time push the "ENTER" key. The LCD then displays "NUMBER OF PEOPLE". Your party will then be issued a reservation number used for the final seating. This number appears on the reservation pads. You should record the name of the party on this pad along with a seating time.

ENTERING RESERVATION BY PARTY SIZE—The most efficient way to make reservations is by the size of the party. This allows the computer to make decisions based on the current status of the restaurant and taking under consideration all reservations currently booked. To take a table reservation by the size of the party, push the RESERVE key. The display will respond with "RESERVE BY SIZE, TABLe or DELete reservation". Press the soft key under the LCD marked SIZE. You will then be asked for a reservation time. Using the numeric keypad enter the time starting with the hours and then minutes. The computer will assume an AM or PM seating time based on the current time however, if you need to change the time from AM to PM use the UP or DOWN arrow keys. When you have successfully entered the time push the "ENTER" key. The LCD then displays "NUMBER OF PEOPLE". Enter the party size and continue by pressing the "ENTER" key. Finally the LCD will request SMOKing, Non-SMOKing, and NO PReference. Using the soft keys below the LCD window, enter their preferred area type. Your party will the be issued a reservation number used for the final seating. This number appears on the reservation pads. You should record the name of the party on this pad along with a seating time. When a table becomes available at the time of the reservation, the computer will beep twice, indicating that a table has become ready for a reservation.

SEATING A RESERVATION WHEN IT ARRIVES—To seat a pre-reserved table, start by pushing the SEATED button. Next, the display will request Seat table by SIZE, TABLe, RESerVation, or mOVE." Using the soft keys at the top of the keypad, push the corresponding key for RESerVation. The next prompt will read "SEAT BY RESERVATION. ENTER #. Using the numeric keypad, enter the reservation number and follow the number with the ENTER key. The computer will then locate the table reserved for your party and will respond with "PLEASE SEAT AT TABLE_. If the computer fails to locate a reserved table due to a party or group of tables exceeding the AVERAGE SEATING TIME, the computer will respond with 'TABLE NOT YET AVAILABLE". When this occurs, your reservation will be placed first in the internal waiting line and the Host/Hostess will be notified immediately after the table has been cleared.

DELETING A PENDING RESERVATION—To delete a pending reservation, you push the key marked Table Reserved from the main menu. The display then will request Reservation by SIZE, TABLe or DELete a reservation. Using the soft keys below the LCD window, push the rightmost key under the word DELete. The display then will read DELETE RESERVATION—ENTER #. Enter the reservation number you wish to delete and you will be returned to the main menu.

Figure 6:
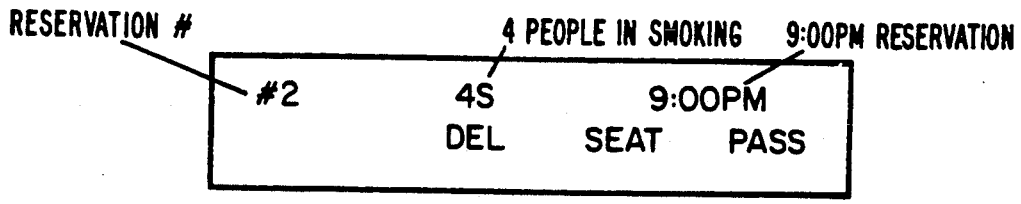
FIG. 6 is a diagram showing the appearance of the LCD display when a table becomes available for a reservation.

Whenever a table becomes available due to a clearing by the busing staff, the computer immediately begins to search the waiting lines for a matchup of parties to tables. These waiting lines can be reservations from phone in or walk-in reservations. When a matchup is found the Host/Hostess is informed by a 2-tone audible tone and a message on the LCD information display as shown in FIG. 6.

This display indicates that a table has been located for reservation #2 for 4 people in a Smoking Area and the current time. On the second line of the display, the operator is asked to DELete this reservation, SEAT the party or PASS. DELete is used to indicate that you wish to remove the reservation from the system and the party will not be seated. SEAT should be pushed when the party is ready to be seated. PASS will temporarily hold the reservation and table until you can locate the party. Each minute afterwards, the computer will beep 3 times and again display the above screen, asking the Host/Hostess if this party is ready yet. If the Host continues to PASS beyond the maximum allowed reservation no-show time, the reservation will be automatically cancelled.

USING THE TABLE STATUS KEY—This key in the upper left hand corner of the keyboard is used to determine the status of any table in the restaurant, display the current status of any reservation, show the average actual table turn times for the current day, or find out how many patrons have been seated during a lunch or dinner hour.

Figure 7:
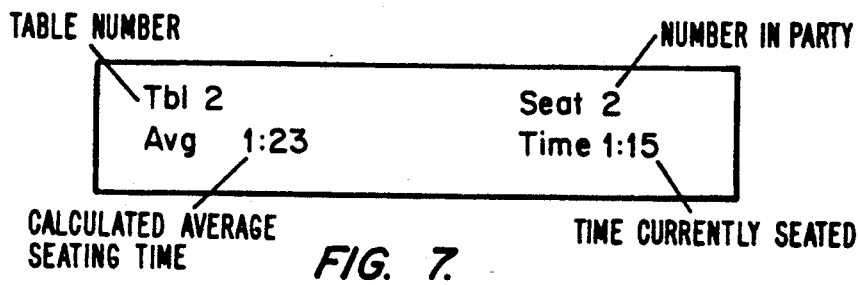
FIG. 7 is a diagram showing the appearance of the LCD display when the status of a table is requested.

CHECKING THE STATUS OF A SPECIFIC TABLE—At any time, the computer can be used to determine the actual statistics of any table in the restaurant. To use this function, press the TABLE STATUS key. You are then presented with 4 options, TABL, RESV, SIZE, and SEAT. Push the soft key directly under the word TABL. The LCD information display will then show TABLE STATUS—TABLE#: _. Enter the table number followed by the ENTER key. The information display then displays the statistics as shown in FIG. 7.

Figure 8:
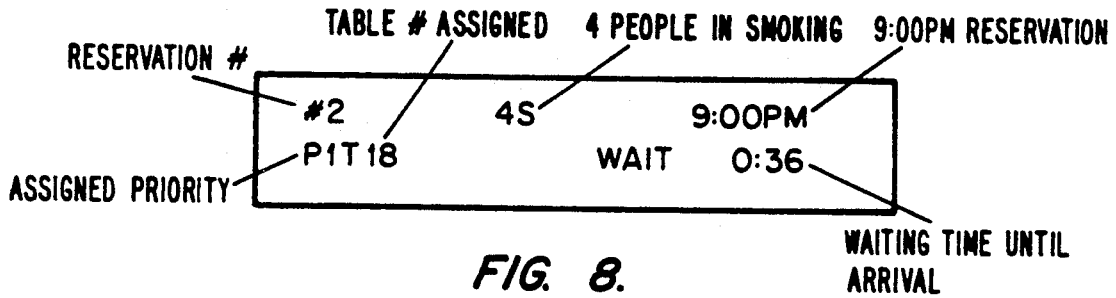
FIG. 8 is a diagram showing the appearance of the LCD display when the status of a pending reservation is requested.

CHECKING THE STATUS OF A PENDING RESERVATION—To check the status of a pending reservation, push the TABLE STATUS key, which will again bring up the menu requesting TABLe, RESerVation SIZE & SEAT. Use the appropriate soft key to select RESERVATION directly under the word RESV in the display window. Next, the display will request a reservation number. Using the numeric keypad, simply enter the reservation number in question and follow it with the ENTER key. The display will show the information as in FIG. 8.

Figure 9:
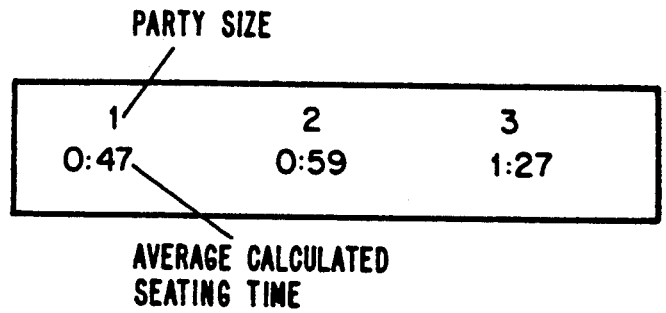
FIG. 9 is a diagram showing the appearance of the LCD display when the average seating times are requested.

DISPLAYING AVERAGE SEATING TIMES BY THE SIZE OF THE PARTY—To display the average seating times by the party size, simply press the TABLE STATUS key. When you are presented with the options TABL, RESV, SIZE, and SEAT, press the third choice SIZE. Immediately the LCD information display will show party sizes with actual average seating times for the current day as shown in FIG. 9.

To scroll through higher party sizes, simply press the up arrows and watch the display move to the right. To return to the lower sizes, press the down arrow and the display will move to the left. To exit this mode, press the ENTER key or let the menu time out and return to the main menu.

While the above is a complete description of a preferred embodiment of the present invention, various modifications may be employed. For example, master table status control unit 14 may be used alone in smaller restaurants. In other embodiments, the battery backed-up RAMs in each slave unit may be used to restore that unit's state in the event of a power failure, rather than rely upon the data stored in master table status control unit 14.

The teachings of the present invention may be applied to a number of other applications. For example, the present invention could be used for parking garage space assignment, seating assignments in large entertainment complexes, fire or security alarm status indication, sprinkler system timing for large building complexes, indicating whether employees are available, out of the office, expected to return, etc., and sample tracking for keeping track of samples which are placed in certain location for selected time intervals. Consequently, the scope of the invention should not be limited except as described in the claims.

What is claimed is:

1. An apparatus for processing information about the status of a plurality of tables comprising:
   an electronic memory;
   table identifying means for storing a plurality of table identifying codes in the memory, each table identifying code identifying a selected table;
   table size means for storing a plurality of table size codes in the memory, each table size code indicating a maximum intended number of people accommodated by an identified table;

availability status means for storing a plurality of availability status codes in the memory, each availability status code indicating whether an identified table is available, the availability status codes including an occupied status code indicating the identified table is occupied and a vacant status code indicating the identified table is vacant;

table request means for entering a table request code indicating a requested table number;

table number comparing means, coupled to the table request means and to the table identifying means, for comparing the table request code to a stored table identifying code;

table match identifying means, coupled to the table number comparing means, for providing a table match signal indicating when the requested table number corresponds to a stored table identifying code;

status comparing means, coupled to the table match indicating means, for comparing the availability code associated with the table identifying code which caused the generation of the table match signal to a vacancy status code which indicates that a table is vacant;

vacancy indicating means, coupled to the status comparing means, for providing a vacancy signal when the availability code corresponds to the vacancy status code; and wherein the availability status means stores an occupied status code as the availability status code corresponding to the table identifying code which caused the generation of the table match signal in response to the table match signal and the vacancy signal.

2. The apparatus according to claim 1 further comprising:

size request means for entering a size request code indicating a requested number of people to be accommodated by a table;

size comparing means, coupled to the size request means and to the table size means, for comparing the size request code to the table size code associated with the table identifying code which caused the generation of the table match signal;

size match status indicating means, coupled to the size comparing means, for providing a size mismatch signal indicating when the requested number of people to be accommodated by a table is greater than the number of people accommodated by a table as indicated by the stored table size code;

confirmation means for selectively providing a confirmation signal; and wherein the availability status means stores the occupied status code as the availability status code in response to the confirmation signal.

3. The apparatus according to claim 2 further comprising average seating time calculating means, coupled to the availability status means, for calculating an average seating time corresponding to each unique table size code.

4. The apparatus according to claim 3 wherein the average seating time calculating means calculates the average seating time for the table size code corresponding to the size request code in response to the confirmation signal.

5. An apparatus for processing information about the status of a plurality of tables comprising:

an electronic memory;

table identifying means for storing a plurality of table identifying codes in the memory, each table identifying code identifying a selected table;

table size means for storing a plurality of table size codes in the memory, each table size code indicating a maximum intended number of people accommodated by an identified table;

availability status means for storing a plurality of availability status codes in the memory, each availability status code indicating whether an identified table is available, the availability status codes including an occupied status code indicating the identified table is occupied and a vacant status code indicating the identified table is vacant;

size request means for entering a size request code indicating a requested number of people to be accommodated by a table;

size comparing means, coupled to the size request means and to the table size means, for comparing the size request code to a stored table size code;

size match indicating means, coupled to the size comparing means, for providing a size match signal indicating when the requested number of people to be accommodated by a table is not greater than the number of people accommodated by a table as indicated by the stored table size code;

status comparing means, coupled to the size match indicating means, for comparing the availability code associated with the table size code which caused the generation of the size match signal to a vacancy status code which indicates that a table is vacant;

vacancy indicating means, coupled to the status comparing means, for providing a vacancy signal when the availability code corresponds the vacancy status code; and wherein the availability status means stores an occupied status code as the availability status code corresponding to the table identifying code associated with the table size code which caused the generation of the size match signal in response to the size match signal and the vacancy signal.

6. The apparatus according to claim 5 further comprising:

smoking status means for storing a plurality of smoking status codes in the memory, each smoking status code indicating a smoking status of an identified table;

smoking status request means for entering a smoking status request code indicating a requested smoking status for a table;

smoking status comparing means, coupled to the smoking status request means and to the smoking status means, for comparing the smoking status request code to a stored smoking status code;

smoking status indicating means, coupled to the smoking status comparing means, for providing a smoking status match signal indicating when the requested smoking status corresponds to a stored smoking status code;

wherein the status assigning means stores an occupied status code as the availability status code corresponding to the table identifying code associated with the smoking status code which caused the generation of the smoking status match signal in response to the size match signal, the smoking status match signal, and the vacancy signal.

7. The apparatus according to claim 6 further comprising average seating time calculating means, coupled to the availability status means, for calculating an average seating time corresponding to each unique smoking status code.

8. The apparatus according to claim 5 further comprising:
   priority status means for storing a plurality of priority status codes in the memory, each priority status code indicating a priority status of an identified table;
   priority status request means for entering a priority status request code indicating a requested priority status for a table;
   priority status comparing means, coupled to the priority status request means and to the priority status means, for comparing the priority status request code to a stored priority status code;
   priority status indicating means, coupled to the priority status comparing means, for providing a priority status match signal indicating when the requested priority status is greater than or equal to a stored priority status code; and
   wherein the status assigning means stores an occupied status code as the availability status code corresponding to the table identifying code associated with the priority status code which caused the generation of the priority status match signal in response to the size match signal, the priority status match signal, and the vacancy signal.

9. The apparatus according to claim 5 further comprising:
   class status means for storing a plurality of class status codes in the memory, each class status code indicating a class status of an identified table;
   class status request means for entering a class status request code indicating a requested class status for a table;
   class status comparing means, coupled to the class status request means and to the class status means, for comparing the class status request code to a stored class status code;
   class status indicating means, coupled to the class status comparing means, for providing a class status match signal indicating when the requested class status corresponds to a stored class status code; and
   wherein the status assigning means stores an occupied status code as the availability status code corresponding to the table identifying code associated with the class status code which caused the generation of the class status match signal in response to the size match signal, the class status match signal, and the vacancy signal.

10. The apparatus according to claim 5 further comprising area status means for storing a plurality of area status codes, in the memory each area status code indicating an area status of an identified table.

11. The apparatus according to claim 10 wherein each area status code has a plurality of identified tables associated therewith, and further comprising:
    area table summing means, coupled to the area status means, for calculating an area table sum for each area status code which indicates a number of identified tables having that area status code and an availability status code corresponding to the occupied status code associated therewith;
    area sum comparing means, coupled to the area summing means, for comparing the area sums to each other; and
    minimum sum indicating means, coupled to the area sum comparing means, for providing a table balancing signal for an identified table which caused the generation of a size match signal and which has an area status code associated with an area sum that is not greater than the area sum associated with any other area status code.

12. The apparatus according to claim 11 further comprising:
    table balance confirming means for providing a table balance confirm signal; and
    wherein the availability status means stores an occupied status code as the availability status code corresponding to the table identifying code which caused the generation of the table balancing signal in response to the table balance confirm signal.

13. The apparatus according to claim 12 further comprising table balance override means for providing a table balance override signal; and
    wherein the availability status means stores an occupied status code as the availability status code corresponding to a table identifying code which did not cause the generation of the table balancing signal in response to the table balance override signal.

14. The apparatus according to claim 11 further comprising:
    balance rate means for storing a balance rate code in the memory, the balance rate code being associated with a selected area status code; and
    wherein the table balancing signal is provided for an identified table which has an area status code associated with an area sum that is not greater than the area sum associated with any other area status code only after that area status code has been determined to be associated with an area sum that is not greater than the area sum associated with any other area status code for a selected number of comparisons calculated from the balance rate code.

15. The apparatus according to claim 10 wherein each area status code has a plurality of identified tables associated therewith, and further comprising:
    area person summing means, coupled to the area status means, for calculating an area person sum for each area status code which indicates a number of people occupying identified tables having that area status code associated therewith;
    area person sum comparing means, coupled to the area person summing means, for comparing the area person sums to each other; and
    minimum person sum indicating means, coupled to the area person sum comparing means, for providing a table balancing signal for an identified table which caused the generation of a size match signal and which has an area status code associated with an area person sum that is not greater than the area person sum associated with any other area status code.

16. The apparatus according to claim 15 further comprising:
    table balance confirming means for providing a table balance confirm signal; and
    wherein the availability status means stores an occupied status code as the availability status code corresponding to the table identifying code which caused the generation of the table balancing signal in response to the table balance confirm signal.

17. The apparatus according to claim 16 further comprising table balance override means for providing a table balance override signal; and
wherein the availability status means stores an occupied status code as the availability status code corresponding to a table identifying code which did not cause the generation of the table balancing signal in response to the table balance override signal.

18. The apparatus according to claim 10 further comprising closed status request means for providing a closed status request signal corresponding to an identified table.

19. The apparatus according to claim 18 wherein the availability status means stores a closed status code as the availability status code for the identified table in response to the closed status request signal when the identified table has an availability code associated therewith corresponding to the vacancy code.

20. The apparatus according to claim 10 further comprising area rotation means, coupled to the area status means, for assigning an area rotation code to each area status code wherein the area rotation code indicates how recently an availability status code associated with that area status code was changed to an occupied status; and
wherein the vacancy indicating means provides the vacancy signal for a table in an area having an area rotation code that indicates that an availability status code associated with that area was least recently changed to an occupied status.

21. The apparatus according to claim 5 wherein the size match status indicating means provides the size match signal when the requested number of people to be accommodated by a table is less than the number of people accommodated by a table as indicated by the stored table size code and there is no identified table which accommodates a number of people equal to the requested number of people and has an availability code corresponding to the vacancy code.

22. The apparatus according to claim 5 further comprising average seating time calculating means, coupled to the availability status means, for calculating an average seating time corresponding to each unique table size code.

23. The apparatus according to claim 22 further comprising seating time calculating means for calculating a seating time for each identified table corresponding to the amount of time the identified table has associated therewith an code which caused the generation of the class status match signal in response to the size match signal, the class status match signal, and the vacancy signal.

24. The apparatus according to claim 23 further comprising:
seating time comparing means for comparing the seating time for each identified table with the average seating time associated with the table;
excess time indicating means, coupled to the seating time comparing means, for providing an excess time indicating signal when the seating time calculated for an identified table is greater than the average seating time associated with that table.

25. The apparatus according to claim 23 further comprising:
time difference calculating means for calculating a difference time representing a difference between the average seating time associated with an identified table and the calculated seating time for that table when no size match signal is generated in response to an entered size request code; and
time difference display means, coupled to the time difference calculating means, for displaying the difference time when no size match signal is generated in response to the entered size request code.

26. An apparatus for monitoring the status of a plurality of tables comprising:
a first table status processing unit including:
a first plurality of visual indicators, each visual indicator corresponding to an associated table for visually indicating the status of that table, the status including an occupied status, a vacant status, and a reserved status;
a first keypad having a plurality of closely-spaced entry keys for entering status codes corresponding to a first group of tables;
wherein the first keypad includes reservation time entry means for entering a code corresponding to a reservation time at which a selected table has a reserved status; a second table status processing unit including:
a second plurality of visual indicators, each visual indicator corresponding to an associated table in the first group of tables;
status entry means for entering status information corresponding to the first group of tables;
a processor for receiving the status codes and the status information and for activating the first and second pluralities of visual indicators for indicating the status of each table in the first group, the processor comprising:
occupied status timing means for timing the occupied status of a table;
occupied status average time means for providing an occupied status average time for a table; and
reserved status prohibiting means for prohibiting the assignment of a reservation time to a selected table when the table has an occupied status and the difference between the occupied status average time for that table and a time occupied status for that table is greater than the time remaining until the reservation time.

27. The apparatus according to claim 26 wherein the processor further comprises occupied status prohibiting means for prohibiting the assignment of an occupied status to a selected table when a reservation time has been assigned to that table and the average occupied status time for that table is greater than the time remaining until the reservation time.

28. The apparatus according to claim 27 wherein the processor further comprises table recommending means for recommending another table having a vacant status when the assignment of an occupied status to the selected table is prohibited.

29. The apparatus according to claim 28 wherein the processor further comprises future status indicating means for activating the first plurality of visual indicators to indicate the status of each table in the first group at the reservation time when the reservation time is entered.

30. The apparatus according to claim 29 wherein the status of each table includes a possible conflict with a future reservation status.

* * * * *